May 7, 1963 M. W. LINDENTHAL 3,089,091

SEQUENTIAL SAMPLING SYSTEM USING COMMUTATING DEVICES PROVIDING CONTROL SIGNALS FOR BIASING AND SWITCHING OF TRANSISTORS

Filed April 7, 1959 3 Sheets-Sheet 1

INVENTOR
MURRAY W. LINDENTHAL
BY Julian C. Renfro
ATTORNEY

May 7, 1963 M. W. LINDENTHAL 3,089,091

SEQUENTIAL SAMPLING SYSTEM USING COMMUTATING DEVICES PROVIDING CONTROL SIGNALS FOR BIASING AND SWITCHING OF TRANSISTORS

Filed April 7, 1959 3 Sheets-Sheet 2

INVENTOR
MURRAY W. LINDENTHAL
BY Julian C. Renfro
ATTORNEY

INVENTOR
MURRAY W. LINDENTHAL
BY Julian C. Renfro
ATTORNEY 3,089,091

SEQUENTIAL SAMPLING SYSTEM USING COMMUTATING DEVICES PROVIDING CONTROL SIGNALS FOR BIASING AND SWITCHING OF TRANSISTORS

Murray W. Lindenthal, Baltimore, Md., assignor to Martin-Marietta Corporation, a corporation of Maryland Filed Apr. 7, 1959, Ser. No. 804,669
14 Claims. (Cl. 328—104)

The present invention relates to sequential sampling systems and more especially to electronic voltage sampling and switching systems and apparatus capable of operating at extremely high speeds.

The system in accordance with the invention is capable of operating at any speeds up to ten megacycles or more and, therefore, is particularly adapted for data sampling, telemetering and in various computer systems. The apparatus required in the system of the invention is rugged, compact and of light weight, and therefore is especially useful in obtaining and recording missile and aircraft flight test data.

In accordance with the invention magnetron beam switching tubes are advantageously employed not only as commutating devices, but additionally as the source of electric power for the switching circuits which effect the sampling. The switching circuits employ transistors. In addition to the high sampling speeds achieved by the present system, the exclusive use of transistors for the switching devices provides greatly reduced power consumption, and a minimum number of circuit components with accompanying simplification of the circutiry. Furthermore, only one power source, i.e., one of the direct current, is required for the entire system if a suitable type of magnetron beam switching tube is used. Since the synchronizing control signal from the beam switching tube also provides operating power for the transistor switches, the duty cycle can approach 100%, which is extremely high compared with previous systems employing electromechanical relays and several power sources.

The nature of the invention and its many advantages will be better understood by consideration of the following specification in connection with the accompanying drawings, in which.

Figure 1:
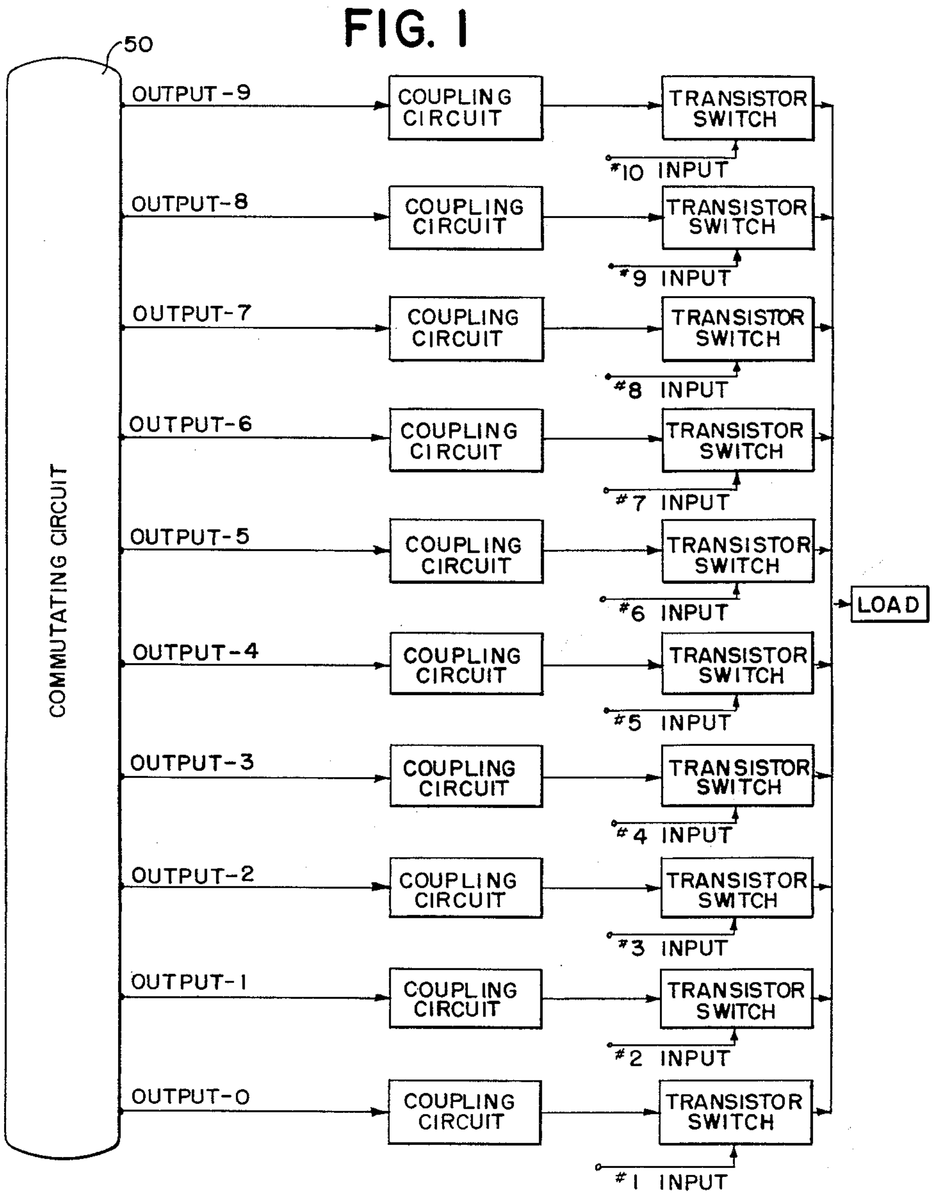
FIG. 1 is a block diagram of a simple system according to the invention.

Referring to FIG. 1, a commutator circuit 50 is shown to have ten outputs. The outputs are numbered 0 to 9 on the assumption that this circuit includes a magnetron beam switching tube of conventional type, sometimes herein referred to as an MBS tube. MBS tubes suitable for use in the system of the invention are manufactured by Burroughs Corporation, Plainfield, N.J., type 6701 being satisfactory. Engineering data and typical driver and utilization circuits for such tubes are available from the manufacture. Such a beam switching tube can be connected to provide at its output terminals uni-directional voltage pulses which are here employed to synchronously control the various transistor switches and simultaneously provide the required bias potentials for activating the transistors. To this end each output terminal of the MBS tube is connected to a transistor through a coupling circuit to average the pulse voltage which is then applied to a suitable electrode of the transistor. The outputs of the several transistor switching circuits are connected in common to the utilization device or load circuit. In many useful applications the load circuit would comprise an analog-to-digital converter of which the output signals are commonly recorded on a magnetic tape device.

In FIG. 1 inputs numbered from #1 to #10, inclusive, are shown connected to the 10 transistor switches. However, any number of inputs up to 10, can, of course, be utilized, and these are connected to the voltage sources to be sampled in sequence.

Figures 2, 4:
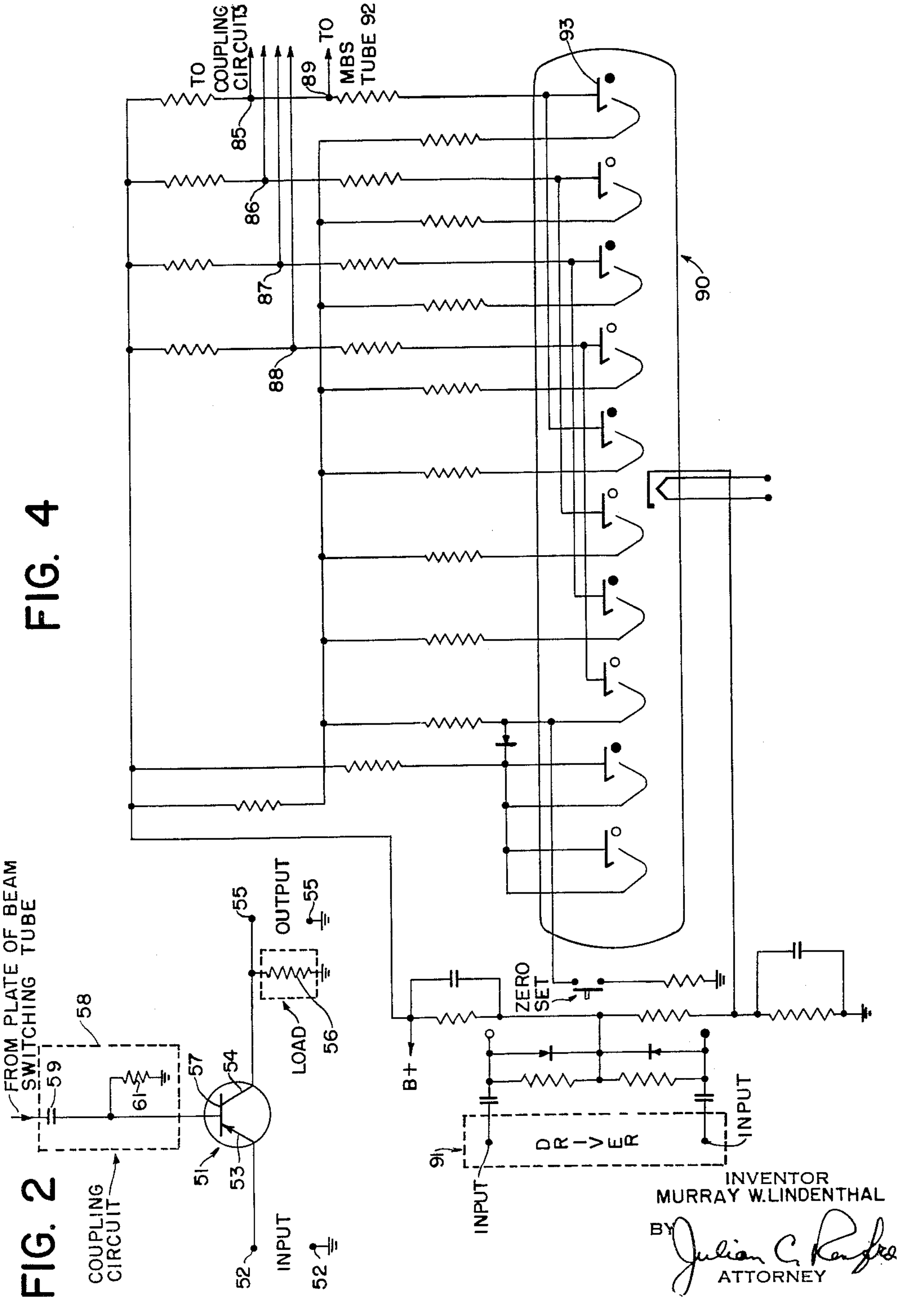
FIG. 2 is a circuit diagram of a transistor switching circuit according to the invention.
FIG. 4 is a schematic diagram showing a magnetron beam switching tube connected in a commutator circuit suited to control the switching system of FIG. 3, or of FIG. 1.

The nature of a suitable transistor switching circuit and of the averaging circuit which couples it to an output of the MBS tube will be clear from FIG. 2. Here a transistor 51, represented as the PNP type, is employed preferably because the output of the beam switching tube is a negative-going pulse. If a type NPN transistor is used, then the pulse should be inverted in well known manner before being applied to the coupling circuit. If the pulse is not inverted, then the switch would be activated for a long duration and deactivated for the relatively short duration of the pulse width. As shown in FIG. 2 the input voltage to be sampled is connected between terminals 52 so as to impress the voltage on the emitter electrode 53. The collector 54 is connected, as shown, to an output terminal 55 to which a load resistor 56 is also shown to be connected. The base 57 is connected through coupling circuit 58 to one of the targets or output plates of the MBS tube. As shown in the diagram, the coupling circuit comprises a coupling capacitor 59 with a resistor 61 ground return. The values of these two circuit elements are selected to meet the operating requirements, including the pulse rate. During the time a negative-going pulse is impressed through the described coupling circuit to the base 57 of transistor 51, the transistor switch will effectively be closed and the signal voltage to be sampled, as applied at terminals 52, will be allowed to pass through the switch to the load which, as shown in FIG. 1, is connected in common to all of the switching circuits. At all other times the transistor switch is effectively open. Assuming that there are 10 inputs to the system, as shown in FIG. 1, the MBS tube will activate the transistor circuits sequentially, at the preselected sampling rate. The period when each switch is "on" and is adapted to deliver an output voltage, is equal to the reciprocal of the rate of operation of the beam switching tube which, in this simple system, would normally be continuously repetitive. From consideration of FIGS. 1 and 2 it will be observed that, as above mentioned, the present invention eliminates the necessity for batteries or other of the customary sources of biasing potential for the transistor switching circuits.

Figure 3:
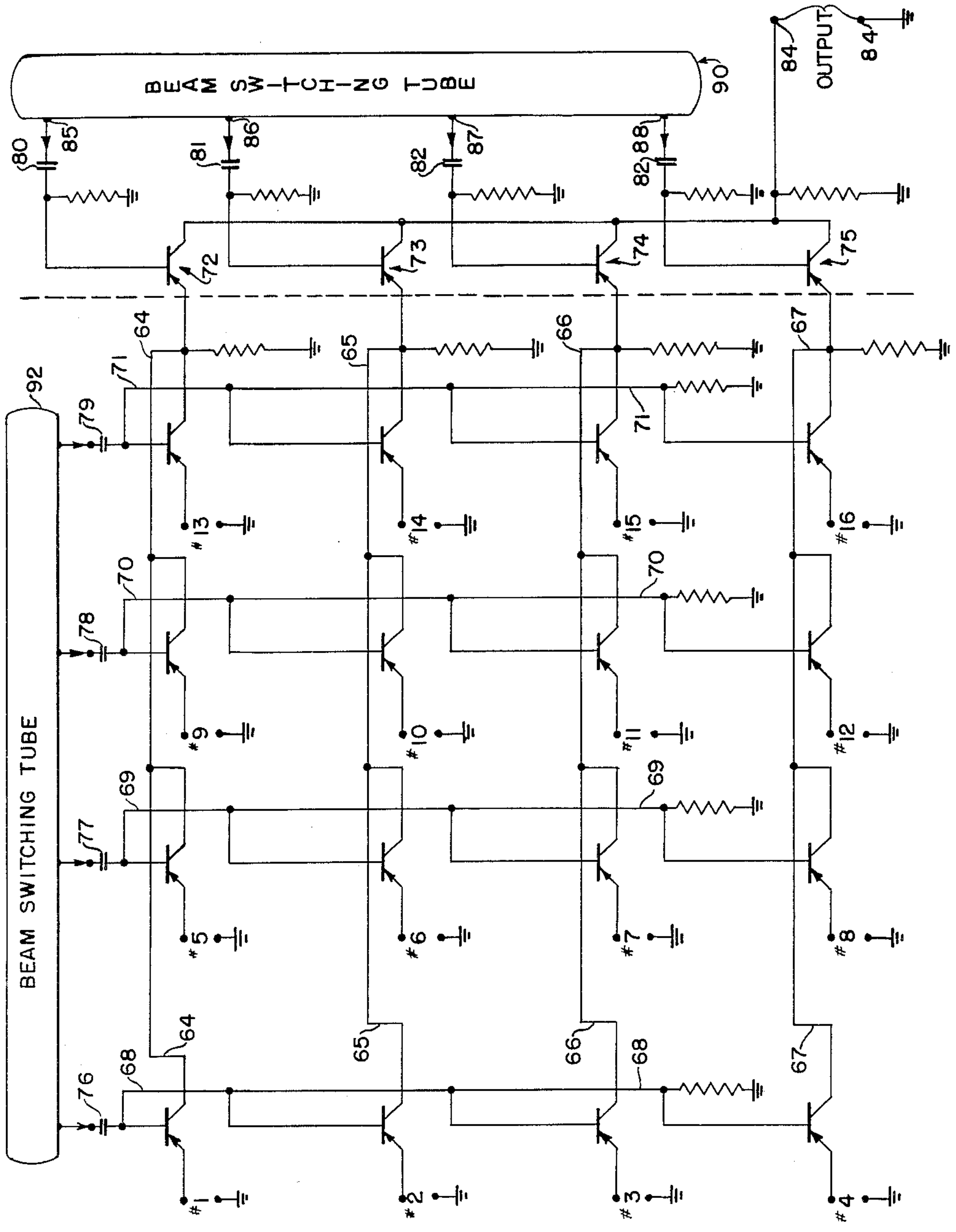
FIG. 3 is a circuit diagram of a system of transistor switching circuits adapted to sample a larger number of input voltages, and at higher speeds.

If a greater number than 10 inputs be required or if more rapid sampling be desired, or both, the system of the invention can be expanded, as shown in FIGS. 3 and 4. By way of example, this system is represented to accommodate 16 inputs, but the same system could readily be modified to accommodate a greater number of inputs up to 100 while employing but two beam switching tubes. In the present example, each of the two MBS tubes utilizes 4 of its 10 positions. However, the system could as well be arranged so that one MBS tube utilizes two positions and the other eight positions, for instance.

It will be noted from FIG. 3 that to the left of the vertical dash line there is a matrix including 16 transistors of the PNP type. As before, the source of input voltage to be sampled is connected to the emitter of each transistor, the input terminals being designated #1 to #16, inclusive. It will be observed that the collectors of the transistors which are arranged in each of the four horizontal groups are connected in common. Hence counting from the top in the drawing, the first four collectors in the first horizontal group are connected to the horizontal common bus 64. Those of the second horizontal group are connected to bus 65, those of the third group to bus 66 and those of the fourth horizontal group to bus 67. Likewise it will be observed that the base electrodes of the four transistors in the first vertical group, counting from the left in the drawing, are connected to a vertical common bus 68. Those of the second vertical group are connected to bus 69, those of the third vertical group to bus 70 and those of the fourth vertical group to bus 71. The vertical buses are connected, respectively, through capacitive coupling circuits 76–79, inclusive, to the output terminals of a first beam switching tube as described below. The horizontal buses are connected to an array of additional transistors next to be described. The terms "horizontal" and "vertical" are used here and in the claims not in the space-orientation sense, but merely to distinguish the two groups of transistor switches and their relative connections.

To the right of the vertical dash line in FIG. 3, four additional transistors 72, 73, 74, 75, are shown, each with its emitter connected to one of the mentioned horizontal buses 64–67, respectively. Thus each one of these emitter electrodes is connected to the collectors of all of the four transistors forming one horizontal group. The base electrodes of transistors 72–75, inclusive, are connected respectively to the output or target terminals of a second beam switching tube through capacitive coupling circuits 80–83, inclusive. The output of the entire system is available at terminals 84 which connect to the collectors of the four transistors 72–75 and to the common ground, as shown. The operation of this system is described below.

FIG. 4 represents a magnetron beam switching tube 90 modified to utilize four of its positions as required for the configuration of FIG. 3. Two such switching tubes are required. The output terminals 85–88 (upper right, in the drawing) of tube 90 are connected respectively to the capacitive coupling circuits 80–83 FIG. 3, and similar output terminals of the second MBS tube 92 are connected to the capacitive coupling circuits 76–79, respectively. In order that the system operate as intended, MBS tube 90 should operate at a rate equal to that of tube 92 multiplied by the number of positions utilized for the tube 90. In this case this means that the MBS tube 90 operates four times as fast as tube 92. The driver circuit 91 for MBS tube 90 is shown to its left, and can be of conventional all-transistor type. This causes the tube to operate continuously. In order to cause the system to be self-sustaining, the beam switching tube 90 should be connected to trigger tube 92. For this purpose a connection from terminal 89 is made to a suitable control electrode of tube 92 in a manner well known in the art. By this means a portion of the pulse from the last target or output plate 93 will cause the first beam switching tube to move to its next position. In other words, in the system of FIGS. 3 and 4, the tube 90 is arranged to be self-sustaining or oscillating, whereas tube 92 is switched under the control of tube 90. Other comparable control arrangements could be used.

From the foregoing it will be evident that once the operation of the system has been initiated, tube 92 will activate the first vertical group of transistor switches (which have inputs #1–#4). Now, while the first MBS tube is still at its initial position, the second beam switching tube will activate the four transistors 72–75 sequentially and thus will connect the output or load circuit to the first vertical group of transistors in sequential order. In this manner the first four voltage sources will be sampled at the rate of operation of beam switching tube 90. When the latter tube has reached its last and fourth position, the operation of the corresponding fourth pulse will cause tube 92 to switch to its second position, thus disconnecting the first vertical group of transistors and connecting the second vertical group of transistors (inputs #5–#8) to the same four switching transistors 72–75, inclusive. This sequence will be repeated until all 16 inputs are sampled, when the entire operation repeats.

Magnetron beam switching tubes may be driven by non-transistorized drivers, although transistorized drivers permit simple circuitry and have low power requirements. Other appropriate electronic synchronizing circuits, such as counter and multi-vibrator circuits may be substituted in the present system for the magnetron switching tube as the commutator device, although this tube has proved to be reliable and efficient. The type 6701 Burroughs MBS tube may be replaced by the 6700 type tube, or any other equivalent tube.

The system of the invention can be used in an unlimited number of applications which may require different numbers of samples and different sampling rates. One means, in accordance with the invention, for accommodating a greater number of inputs is to enlarge the two-dimensional matrix described in connection with FIG. 3 to form a three-dimensional matrix utilizing three magnetron beam switching tubes operating in sequence. Other modifications of the embodiments herein described will occur to those skilled in the art, all within the scope of the appended claims.

I claim:

1. In a high-speed voltage sampling system, a plurality of switching circuits each circuit including a three-electrode transistor, means for connecting to a first electrode of each transistor a certain source of voltage to be sampled, a utilization circuit, means for commonly connecting said utilization circuit to a second electrode of each transistor, a continuously operable high-speed commutating circuit having a plurality of output terminals at which high-frequency uni-directional pulses are generated in sequence, means including a pulse-connection from each output terminal respectively to the third electrode of a respective transistor for impressing on said last-mentioned transistor operating bias potential derived from said pulses, the impedance between said first and second electrodes being controlled by said operating bias potential for selectably permitting the voltage to be sampled to appear directly at said utilization circuit, and a common connection between said voltage sources, said utilization circuit and said commutating circuit, whereby the operating and control-pulse potential for each switching circuit is derived from said commutating circuit.

2. In a high-speed voltage sampling system, a plurality of switching circuits each circuit including a three-electrode transistor, means for connecting to a first electrode of each transistor a certain source of voltage to be sampled, a utilization circuit, means for commonly connecting said utilization circuit to a second electrode of each transistor, a continuously operable high-speed commutating circuit having a plurality of output terminals at which high-frequency uni-directional pulses are generated in sequence, means including an averaging network connecting each output terminal respectively to the third electrode of each transistor, the impedance between said first and second electrodes being controlled by said high-frequency uni-directional pulses for selectably permitting the voltage to be sampled to appear directly across said utilization circuit, and a common connection between said voltage sources, said utilization circuit and said commutating circuit, whereby the operating and control-pulse potential for each switching circuit is derived from said commutating circuit.

3. In a high-speed voltage sampling system, a plurality of switching circuits each including a transistor having an emitter, a collector and a base, means for connecting to the emitter of each transistor a certain source of voltage to be sampled, a utilization circuit, means for commonly connecting said utilization circuit to the collector of each transistor, a continuously operable commutating circuit including a magnetron beam switching tube having a plurality of output plates at which high-frequency uni-directional synchronizing pulses are generated in sequence, means including an averaging network connecting each plate respectively to the base of each transistor, and a common connection between said voltage sources, said utilization circuit and said commutating circuit whereby the operating and synchronizing pulse potential for each switching circuit is derived exclusively from said commutating circuit.

4. In voltage sampling apparatus for switching a voltage load circuit between a first input voltage source and a second input voltage source, the combination which includes first and second electrically conductive devices each having first, second and third electrodes, a connection from the first voltage source to the first electrode of the first device, a connection from the second voltage source to the first electrode of the second device, commutating circuit means having first and second terminals at which uni-directional pulses are generated in sequence, a load circuit, means for coupling said load circuit to the second electrode of each device, a control-pulse connection from each of said first and second terminals respectively to the third electrode of each of said devices, means including said control pulse connections for impressing on said devices respectively operating bias potentials derived from said pulses, the impedance between said first and second electrodes of each of said devices being controlled by the said operating bias potential introduced to said third electrode thereof for selectably permitting the voltage to be sampled to appear directly across said load circuit, and circuit-completing connections between said devices, said commutating circuit means and said load circuit.

5. In voltage sampling apparatus for switching a voltage load circuit between a first input voltage source and a second input voltage source, the combination which includes first and second electrically conductive devices each having first, second and third electrodes, a connection from the first voltage source to the first electrode of said first device, a connection from the second voltage source to the first electrode of said second device, third and fourth electrically conductive devices each having first, second and third electrodes, a direct coupling connection from the second electrode of said first device to the first electrode of said third device, a coupling connection from the second electrode of said second device to the first electrode of said fourth device, a first commutating circuit having at least first and second terminals at which uni-directional pulses are generated in sequence, a control-pulse connection from said first and second terminals respectively to the third electrode of each of said first and second devices respectively, a load circuit, means for coupling said load circuit to the second electrodes of said third and fourth devices, a second commutating circuit having at least first and second terminals at which uni-directional pulses are generated in sequence, a control-pulse connection from the first and second terminals respectively of said second commutating circuit to the third electrode of each of said third and fourth devices respectively, said first and second commutating circuits and the said connections associated therewith being designed for sequentially providing operating bias potentials on said devices, the impedance between said first and second electrodes of each of said electrically conductive devices being controlled by the unidirectional pulses introduced to said third electrode thereof for selectably permitting signals introduced to said first electrode to appear directly at said second electrode, and circuit completing connections between said devices, said commutating circuits and said load circuit.

6. In voltage sampling apparatus for switching a voltage load circuit between a plurality of input voltage sources in sequence, a matrix comprising a plurality of electrically conductive devices each having first, second, and third electrodes, a plurality of input voltage sources of which each is connected to the first electrode of certain ones of said devices, said devices being subdivided into a plurality of first groups and a plurality of second groups, a first-group common bus connected to the second electrodes of the said devices in each said first group, a second-group common bus connected to the third electrodes of the said devices in each said second group, an array of electrically conductive devices each having first, second and third electrodes, said array including as many said devices as there are said first groups, a connection from each of said first-group buses to the first electrode of one of the devices in said array, respectively, a load circuit, means for coupling said load circuit to the second electrodes of the devices in said array, first commutating circuit means having a plurality of output terminals at which high-frequency uni-directional pulses are generated in sequence, control-pulse connections from said terminals to said second-group buses respectively in sequence, second commutating circuit means having a plurality of output terminals at which uni-directional pulses are generated in sequence, control-pulse connections from the terminals of said second commutating circuit means to the third electrodes of the devices in said array respectively in sequence, means including said control-pulse connections for impressing on said devices operating bias potentials derived from said pulses respectively, the impedance between said first and second electrodes of each of said electrically conductive devices being controlled by the uni-directional pulses introduced to said third electrode thereof for selectably permitting signals introduced to said first electrode to appear directly at said second electrode, and circuit completing connections between said devices, said commutating circuit means and said load circuit.

7. Voltage sampling apparatus according to claim 6, characterized in that each of said input voltage sources is connected to the first electrode of a different one of said first-named electrically conductive devices.

8. In voltage sampling apparatus for switching a voltage load circuit between a plurality of input voltage sources in sequence, a matrix comprising a plurality of electrically conductive devices each having first, second and third electrodes, a plurality of input voltage sources each connected to the first electrode of respective ones of said devices, said devices being subdivided into first groups and second groups, a first-group common bus connected to the second electrode of the said devices in each said first group, a second-group common bus connected to the third electrodes of the said devices in each said second group, an array of electrically conductive devices each having first, second and third electrodes, said array including as many said devices as there are said first groups, a connection from each of said first-group buses to the first electrode of one of the devices in said array, respectively, a load circuit, means for coupling said load circuit to the second electrodes of the devices in said array, a first commutating circuit including a magnetron beam switching tube having a plurality of output plates at which first high-frequency uni-directional synchronizing pulses are generated in sequence, synchronizing control-pulse connections from said plates to said second-group buses respectively in sequence, a second commutating circuit including a second magnetron beam switching tube having a plurality of output plates at which second uni-directional synchronizing pulses are generated in sequence, synchronizing control-pulse connections from the plates of said second magnetron beam switching tube to the third electrodes of the devices in said array respectively in sequence, an averaging network included in each of said control-pulse connections for impressing on said devices operating bias potentials derived from said pulses respectively, the impedance between said first and second electrodes of each of said electrically conductive devices being controlled by the operating bias potential introduced to the third electrode thereof for selectably permitting signals introduced to said first electrode to appear directly at said second electrode, and circuit completing connections between said devices, said commutating circuits and said load circuit.

9. Voltage sampling apparatus according to claim 8 in which said first pulses are of lower frequency than said second pulses.

10. In voltage sampling apparatus according to claim 8 which includes means controlling said second beam switching tube for switching thereof at a rate equal to that of said first beam switching tube multiplied by the number of said first groups.

11. In voltage sampling apparatus according to claim 8 which includes connecting means coupling a portion of the synchronizing pulse voltage at the plate of said second beam switching tube which is last in sequence to a control electrode of said first beam switching tube so as to switch said first switching tube and thereby activate the next subsequent second group of devices.

12. In voltage sampling apparatus for switching a voltage load circuit between a plurality of input voltage sources in sequence, a matrix comprising a plurality of groups of transistors each having base, emitter and collector electrodes, a plurality of input voltage sources each connected to the emitter electrode of at least one of said transistors of said groups, a first commutating circuit including a beam switching tube having a plurality of output plates at which first high-frequency uni-directional synchronizing pulses are generated in sequence, a first plurality of averaging networks each coupled on one side to a respective one of the output plates of said first commutating circuit and commonly connected for providing operating bias from said first pulses to the base electrode of at least one of said transistors in each of said groups so that the base electrodes of all of said transistors of said groups will be activated at least once for each cycle of said first synchronizing pulses, an array of transistors each having a base, emitter and collector electrode, the emitter electrode of each of the said transistors of said array being commonly connected to the collector electrodes of the said transistors in a respective one of said groups, a second commutating circuit including a beam switching tube having a plurality of output plates at which second high-frequency uni-directional synchronizing pulses are generated in sequence, a second plurality of averaging networks each connected to a respective one of said second commutating circuit output plates for sequentially coupling operating bias derived from said second pulses to the base electrodes of said array transistors so that each of said array transistors will be activated at least once for every cycle of said second synchronizing pulses, a load circuit commonly connected to the collector electrodes of said array transistors, and circuit completing connections between said transistors, said commutating circuits, said voltage sources, and said load circuit.

13. A voltage sampling apparatus in accordance with claim 12 which includes means for synchronizing said second commutating circuit so as to produce one said second pulse for each cycle of said first synchronizing pulses.

14. A voltage sampling apparatus in accordance with claim 12 which includes means for synchronizing said first commutating circuit so as to produce one said first synchronizing pulse for each cycle of said second synchronizing pulses.

References Cited in the file of this patent

UNITED STATES PATENTS

| | | |
|---|---|---|
| 2,627,039 | MacWilliams | Jan. 27, 1953 |
| 2,722,649 | Immel et al. | Nov. 1, 1955 |
| 2,848,647 | Kuchinsky et al. | Aug. 19, 1958 |
| 2,851,592 | Webster | Sept. 9, 1958 |
| 2,869,111 | Young | Jan. 13, 1959 |
| 2,871,399 | Scuitto | Jan. 27, 1959 |
| 2,901,640 | Steinman | Aug. 25, 1959 |
| 2,938,194 | Anderson | May 24, 1960 |

OTHER REFERENCES

"32 Channel High-Speed Commutator," by Norman Alpert et al., Electronics, November 1950, vol. 23, issue No. 11, pages 94–97.

Cavalieri, Electronic Design, pages 22 to 25, July 1, 1956.